Nov. 26, 1968   A. T. BOLYNN   3,412,571
REFRIGERATION SYSTEM

Filed Oct. 12, 1966   2 Sheets-Sheet 1

INVENTOR:
ANDREW T. BOLYNN

BY Parrott, Bell, Seltzer, Park & Heard
ATTORNEYS

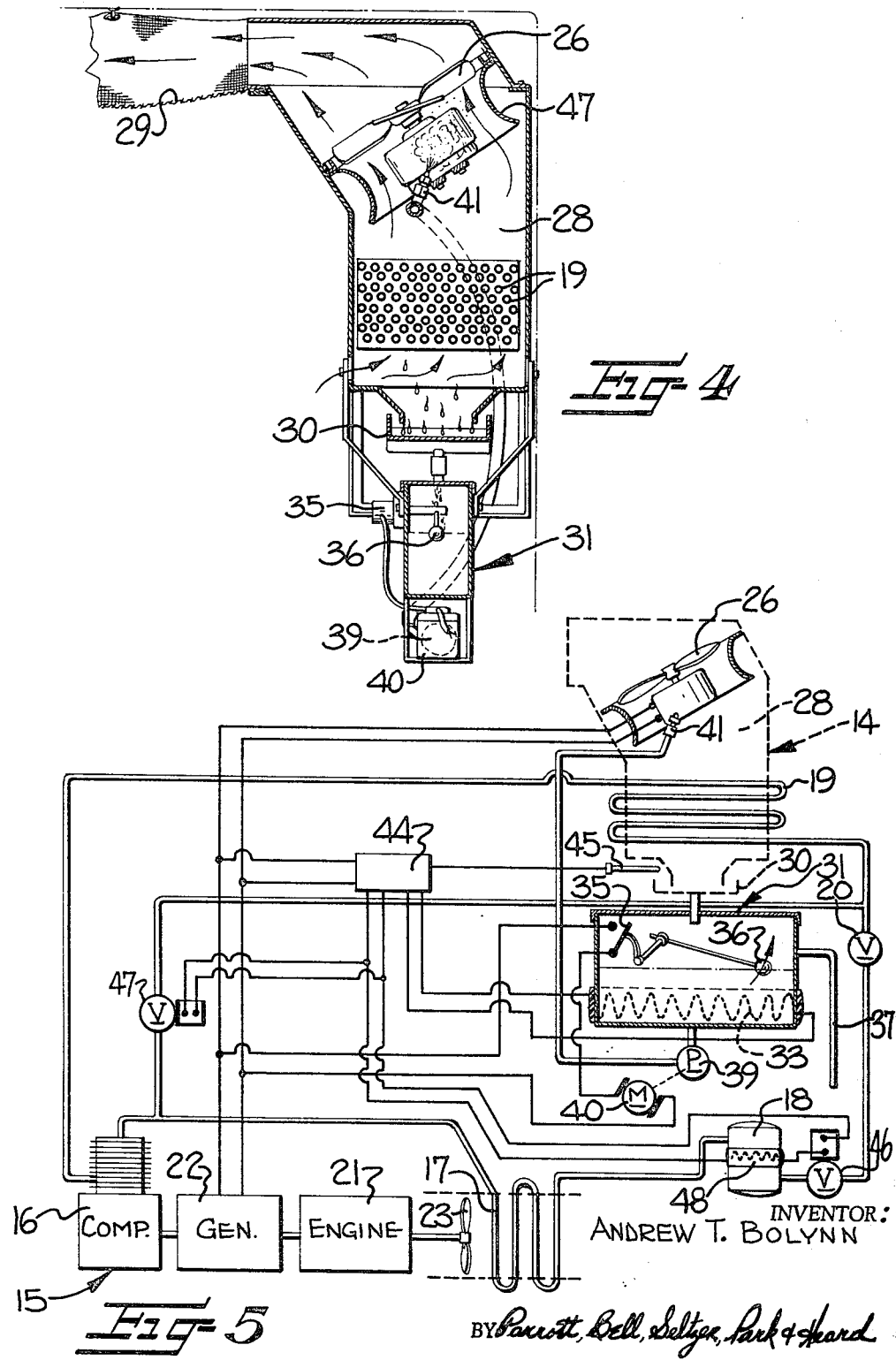

United States Patent Office 3,412,571
Patented Nov. 26, 1968

3,412,571
REFRIGERATION SYSTEM
Andrew T. Bolynn, 4421 Freedom Drive,
Charlotte, N.C. 28208
Filed Oct. 12, 1966, Ser. No. 586,129
3 Claims. (Cl. 62—188)

ABSTRACT OF THE DISCLOSURE

A refrigerating system and method for conditioning a confined space within an automotive vehicle body wherein water condensing on an evaporator is accumulated, stored and dispersed as fine droplets adjacent the exit face of the evaporator to facilitate the achievement of predetermined conditions within the conditioned space.

---

My invention relates to a refrigeration system and, more particularly, to such an apparatus for conditioning a confined space such as within an automotive vehicle trailer body which includes means for facilitating the achievement of a predetermined condition within the conditioned space.

In order to facilitate shipment of perishable goods, such as fresh produce, freshly slaughtered carcasses, and fresh flowers, special refrigerated trucks have been developed for and are used by the trucking industry. These trucks include automotive vehicle bodies, usually trailer vans, including confined spaces to be maintained at temperatures appropriate for the perishable goods being transported. Typically, the means for maintaining the conditioned space at the desired predetermined temperature includes a vapor compression cycle refrigeration producer, having a compressor, a condenser, an evaporator, and means for circulating air within the conditioned space in heat exchange relation with the evaporator.

While this special equipment has made the transportation of perishable goods by the trucking industry practical, certain problems and difficulties in the handling of such goods continue to affect the industry. One problem is particularly apparent in handling perishable goods which are hot when loaded into a conditioned space and are to be cooled therein. Such a thermal load frequently unbalances the refrigeration cycle of a small capacity refrigeration producer, resulting in failure of the producer to satisfactorily assume the thermal load and lower the temperature of the conditioned space and the goods. The most frequently seen example of this unbalanced condition occurs when produce is loaded into the conditioned space of an automotive vehicle body directly from the field where grown, and the refrigeration producer must promptly cool the hot produce to the required temperature for storage in transit.

Heretofore, one solution for this difficulty has been to provide an ice bunker within the conditioned space, in order that the initial cooling load imposed on the refrigeration producer when hot goods are loaded may be partially borne by the melting of ice. While this use of an ice bunker has presented one workable solution, the problem of unbalancing the refrigeration producer still exists if ice is not loaded into the bunker and still further difficulties are introduced in that ice must be provided out in the fields at the loading location.

With the aforementioned difficulties particularly in mind, I have determined that an unbalanced condition of a small capacity refrigeration producer may be entirely avoided through the use of a certain means for the recirculation and spray of condensate water accumulated from the evaporator of the refrigeration producer and stored for recirculation. This solution for the problem of an unbalanced condition avoids the necessity for providing an ice bunker within the conditioned space of an automotive vehicle body, thus freeing additional space for the loading of goods for transit, and frees all persons concerned with the transportation of perishable goods from attending to the supply of ice at the loading location and the loading of ice bunkers with the ice.

It is accordingly an object of this invention to provide, in a refrigeration apparatus for conditioning a space within an automotive vehicle body, of the type described above, means for facilitating the achievement of a predetermined condition within the conditioned space while avoiding an unbalanced condition of the refrigeration producer.

While an additional solution for the problem of cycle unbalance is the use of a large capacity refrigeration producer, such producers are not economically advantageous due to two significant factors. One is the increased cost and weight of the producer unit. The other is the accelerated loss of water from goods being cooled within the confined space. The major significance of this latter factor may be more fully understood when it is pointed out that I have determined that my means for recirculating and dispersing condensate water confers further benefits when used in conditioning a confined space wherein perishable goods are stored. Many goods of this nature require a high humidity environment if the undesirable effects of dehumidification, ranging from weight loss in fresh produce and chickens through "freezer burn" which reduces the commercial value of freshly slaughtered carcasses to wilting of fresh flowers, are to be avoided. Through the application of my invention to refrigeration systems conditioning the spaces wherein such goods are stored, the moisture which would be removed from such goods by conventional operation is returned to the conditioned space to maintain a desirable high humidity environment for the perishable goods being stored.

Accordingly, a more specific object of my invention is to provide a refrigeration system and method wherein moisture condensed on the evaporator coil is accumulated and stored, to be dispersed in fine droplet form intermediate the exit face of the evaporator and a fan circulating air within the conditioned space in heat exchange relationship with the evaporator. The dispersal of condensate water in this fashion not only avoids unbalance of the refrigeration producer due to the sudden imposition of a heavy load, as when hot produce is loaded, but additionally substantially reduces weight loss and other undesirable effects on perishable goods and permits desired conditions within the conditioned space to be more promptly reached as the goods are cooled.

Some of the objects and advantages of the invention having been stated, others will appear as the description proceeds, when taken in connection with the accompanying drawings, in which:

FIGURE 4 is a view, in section, taken substantially along the line 4—4 in FIGURE 2; and FIGURE 5 is a schematic illustration of a refrigerating system incorporating the present invention.

Figure 1:
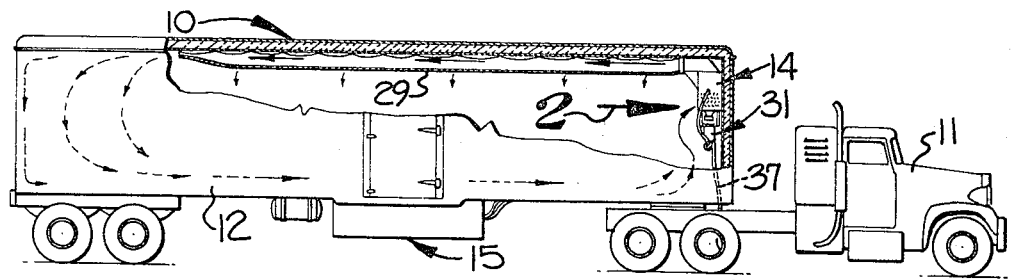
FIGURE 1 is an elevation view, partly broken away, of an automotive vehicle incorporating a refrigeration system in accordance with the present invention.
Figure 2:
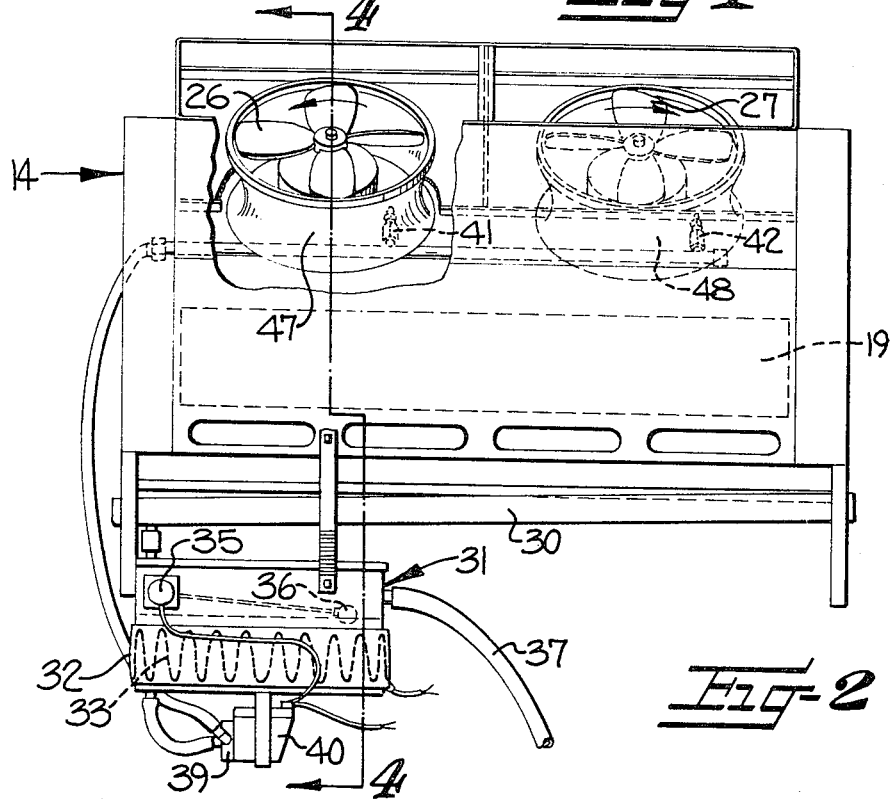
FIGURE 2 is an enlarged elevation view, of a portion of the refrigeration system, taken generally as indicated by the arrow 2 in FIGURE 1.
Figure 3:
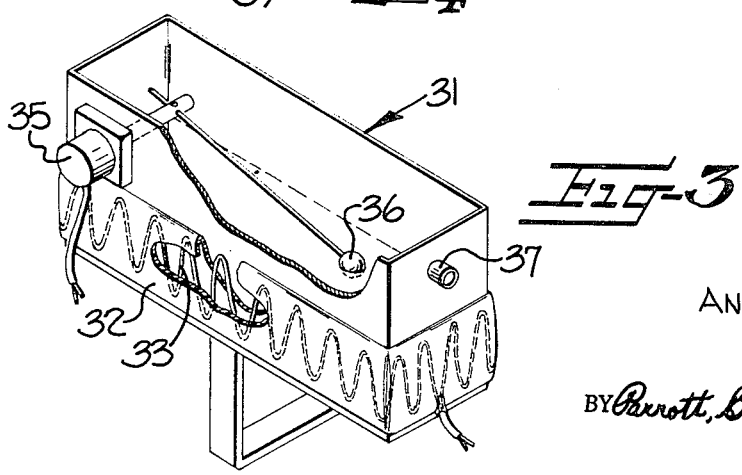
FIGURE 3 is an enlarged perspective view of a portion of the apparatus shown in FIGURE 2, partly broken away.

Referring now more particularly to the drawings, an automotive vehicle is there shown, and indicated generally at 10, which includes a refrigeration system in accordance with the present invention. The illustrated automotive vehicle 10 is typical of an over-the-road rig including a tractor 11 and a trailer 12. The interior of the trailer 12, into which goods to be transported are loaded, defines a confined space which is to be conditioned by a refrigerating system including a vapor compression cycle refrigeration producer. At any given time, the optimum conditions for the space within the trailer 12, to be obtained through the use of the refrigerating system of this invention, will depend at least in part upon the particular goods loaded in the trailer 12 for transportation by the motor vehicle 10.

While my invention will here be described and illustrated with particular reference to the vehicle 10, it should be understood at the outset that it may also be applied to systems for non-automotive use where similar problems occur and the conditioned space is sufficiently confined for the maintenance of predetermined humidity conditions, such as produce, meat, or flower cases.

The operating elements of the refrigerating system for conditioning the space within the trailer 12 are divided between two packages. Mounted within the trailer 12 is an air handling unit, generally indicated at 14, which includes an evaporator and air handling means for flowing air from the conditioned space in heat exchange relation with the evaporator and from an exit face thereof to the conditioned space within the trailer 12. In a separate package, indicated generally at 15 and mounted beneath the trailer 12, are a compressor, a condenser, an electrical current generator, and a prime mover for driving the generator and the compressor. The various elements of the vapor compression cycle refrigeration producer included in these two packages 14 and 15 are noted individually in the schematic illustration of FIGURE 6, wherein may be seen schematic representations of the operating elements included in the refrigerant flow path, including a compressor 16, a condenser 17, a receiver 18, and an evaporator 19. As is conventional with a refrigeration producer of this type, an expansion valve 20 controls the flow of refrigerant from the receiver 18 to the direct expansion evaporator coil 19, wherein a change of refrigerant from the liquid phase to the gaseous phase produces refrigeration. The compressor 16 is driven by a prime mover such as an internal combustion engine 21, which also drives an electrical current generator 22 and a fan 23 operating as a means for flowing air in heat exchange relation with the condenser 17. Other elements of the refrigeration producer, including the control system therefor, will be mentioned hereinafter as required.

In order to facilitate the achievement of predetermined conditions within the conditioned space of the trailer 12, and in accordance with the present invention, I provide means which operate in conjunction with the air handling unit 14 to accumulate and store water condensed on the evaporator 19 from the air flowing therethrough and to recirculate and spray such condensate water adjacent the exit face of the evaporator 19. I have determined that operation of the refrigerating system in this manner results in raising the relative humidity of the air flowing to the conditioned space from the air handling unit 14, so as to maintain the moisture content of the goods being transported, and in lowering the discharge temperature of the air, or dry bulb temperature of air leaving the air handling unit 14, more quickly than would otherwise be the case. It is believed that the co-action of these two effects results in the avoidance of unbalanced conditions which permits the elimination of an ice bunker from the trailer 12 in which the system according to my invention is installed and used.

In circulating air within the conditioned space of the trailer 12 through the air handling package 14 in order to obtain cooling for goods loaded into the trailer 12, a pair of fans 26 and 27 draw air into the lower portion of the air handling unit casing 28 (as indicated by the arrows in the lower portion of FIGURE 4), to the entrance face of the evaporator coil 19, through the coil 19, and from the exit face thereof through the fans and out of the casing 28 through an outlet opening. In order to assure proper distribution of the conditioned air within the trailer 12, a canvas conduit 29 is frequently secured to the outlet opening from the air handling unit casing 28, to distribute conditioned air within the trailer 12 (flow arrows in FIGURE 1). In flowing air through the evaporator coil 19, which is chilled by the direct expansion of refrigerant therein, water is condensed on the evaporator from the air, particularly where the goods being transported within the trailer 12 normally have a high moisture content, such as that in fresh produce or chickens. Droplets of water condensed on the evaporator coil 19 fall to and are collected in a drip pan 30, extending beneath the evaporator coil 19. From the drip pan 30, condensate water flows to and is received within a reservoir tank 31 which, together with the drip pan 30, forms a condensate reservoir means for accumulating and storing the water condensed on the evaporator coil 19. For purposes to be brought out more fully hereinafter, the reservoir tank 31 includes an electrical resistance heater collar 32, encircling the same and including a resistance heating wire 33, and a float switch 35 operated by a float 36 within the tank 31 in response to variations in the level of water stored within the tank 31. An overflow outlet 37 penetrates the wall of the tank 31, and operatively communicates with the outside of the trailer 12 in order to drain an excess of water from the storage tank 31 as described more fully hereinafter.

Condensate water accumulated and stored in the condensate reservoir means is subsequently released adjacent the exit face of the evaporator 19 by a recirculating spray means which operatively communicates with the reservoir means and includes a pump 39, an electrical motor 40 for driving the pump, and fog spray nozzles 41 and 42 positioned intermediate the exit face of the evaporator 19 and the fans which induce the flow of air therethrough. Electrical current is applied to the motor 40 which drives the pump 39 from the generator 22 (FIGURE 5) with the application of voltage being controlled by the float switch 35 mentioned above, as will be pointed out more particularly hereinafter. Current from the generator 22 is also applied to motors driving the fans 26, 27. When the pump 39 is driven by the motor 40, condensate water from the reservoir tank 31 is supplied to the fog nozzles 41, 42 and dispersed as fine droplets in the area intermediate the fans 26, 27 and the exit face of the evaporator coil 19.

Dispersal of the condensate water at this particular location has been found to be critical in this invention, as providing the means for facilitating the achievement of the desired predetermined conditions within the trailer 12. Experiments have been conducted with fogging nozzles located downstream of the fans 26, 27 and upstream of the entrance face of the evaporator coil 19 (both with reference to the flow of air therethrough), and both of these locations have been found to be entirely unsatisfactory. While it is not fully understood precisely why the location intermediate the exit face of the coil 19 and the fans 26, 27 is critical, this is believed to result at least in part from the lower air pressure present in this area due to the air flow restriction imposed by the evaporator 19 and the acceleration of air flow by the fans 26, 27.

In view of this possibility as to the effect of the lower air pressure intermediate the exit face of the coil 19 and the fans, such pressure variation has been maximized through the use of venturi rings 47 and 48, respectively encircling each of the fans 26, 27. These venturi rings further contribute to a reduced pressure in the area wherein the condensate water is being dispersed as fine droplets, contributing to the prompt evaporation of such water into the flow of air passing through the air handling unit 14. In certain arrangements envisioned for air handling units, placement of the condensate reservoir means could be such that the depression of air pressures in the area of spray dispersal, as compared with atmospheric air pressure, as to avoid the requirement of a motor driven pump as a recirculation means.

In use, goods to be transported in the motor vehicle 10 are loaded in the conditioned space of the trailer 12. Where such goods are pre-refrigerated and are loaded while at storage temperature, no difficulty is encountered in initiating operation of the refrigeration system and maintaining the goods at storage temperature during transit while avoiding the dangers of dehumidification. Where the goods are loaded in hot condition and are to be cooled to storage temperature while in transit, as is the case where fresh produce is loaded directly from the fields, operation of the condensate water collection and dispersal means of my invention avoids unbalancing the refrigeration system as the load is cooled from field temperature to storage temperature. Additionally, during such initial pull down of the temperature within the condition space, water which otherwise would be removed from the goods as the same are cooled is returned to the ambient atmosphere within the confined space of the trailer 12, thereby maintaining high humidity conditions in that environment. So long as the predetermined storage conditions maintained within the confined space of the trailer 12 are such that the evaporator coil 19 is maintained above freezing temperatures, water condensed thereon from air flowing therethrough is collected by the drip pan 30 and directed to the reservoir 31 for recirculation substantially as described heretofore.

Refrigeration systems for conditioning confined spaces, such as the interior of the trailer 12, may include refrigeration producers which are cycled on and off in response to conditions within the confined space or may include continually running refrigeration producers wherein control over conditions in the confined space is obtained in some other manner. Inasmuch as my invention is particularly useful in conjunction with a continuously running refrigeration producer controlled in a particular manner, the operation now to be described assumes that the engine 21 continuously drives the compressor 16 and that a thermostatic controller 44 (FIGURE 5) operates to maintain predetermined conditions within the confined space of the trailer 12.

More particularly, with an uncontrolled continuously running refrigeration producer, the temperature of the conditioned space would be steadily reduced until the inherent thermal limitations of the insulation value of the walls of the trailer and the efficiency of the refrigeration producer limited the temperature of the space. As a practical matter this is unsatisfactory, as destructive of goods being transported, and the temperature of the evaporator coil 19 is controlled by the thermostatic controller 44 to maintain a desired set point temperature within the conditioned space. Briefly, the thermostatic controller 44 includes a temperature sensing bulb 45, positioned in the stream of air flowing from the confined space within the trailer 12 to the air handling unit 14, so as to be subjected to the ambient temperature of the confined space. As the temperature within the confined space approaches a set point temperature for which the controller 44 is adjusted, the controller functions to reduce the volume rate of flow of refrigerant through the evaporator coil 19, by unloading one or more cylinders of the compressor 16, and thus reduces the extraction of heat from the evaporator coil 19. Such compressor unloading is conventional in controlling heat exchange rates with vapor compression cycle refrigeration producers.

Where the rate of extraction of heat from the conditioned space continues to exceed the rate of heat exchange into the space, even after reduction of the flow rate of refrigerant through the vapor compression refrigeration cycle by unloading one or more cylinders of the compressor 16 in response to operation of the thermostatic controller 44, and the temperature within the conditioned space drops below the desired predetermined temperature condition, the controller 44 applies current from the generator 22 to close a normally open solenoid valve 46 interposed between the receiver 18 and the expansion valve 20, open a normally closed solenoid valve 47 controlling direct communication between the compressor 16 and the heater band 48 encircling the receiver 18 to heat the refrigerant liquid therein. The effect of these changes in hot gas flow is to raise the operating temperature at the evaporator coil 19, which thereupon heats the air flowing through the air handling unit 14 and raises the temperature within the conditioned space to return to the desired temperature condition.

The inclusion of a heating cycle of this character in the operation of a vapor compression cycle refrigeration producer incorporating my invention frequently results in an additional benefit in maintaining a desired humidity condition within the confined space of the trailer 12. More particularly, where the desired predetermined temperature condition within the trailer 12 is near or below freezing, and the evaporator coil 19 is operating at a surface temperature below the freezing point of water, moisture condensed from air flowing through the evaporator coil 19 does not drain to the drip pan 30 and reservoir 31, but forms ice on the evaporator coil 19. As this occurs, spraying of moisture contained in the reservoir 31 continues until the level of water within the reservoir 31 drops to such a point that the float switch 35 opens and the application of current to the motor 40 is interrupted. Thereafter, sufficient water will not be condensed on the coil 19 and supplied to the reservoir 31 to permit operation of the pump motor 40 and spraying of condensate water until such time as a heating or defrost cycle is initiated by the thermostatic controller 44, in response to a temperature drop below the desired predetermined temperature condition. However, upon the initiation of a heating or defrost cycle, the ice on the coil 19 will be melted, water will flow to the reservoir 31, and will be sprayed from the fog nozzles 41 and 42 adjacent the fans 26, 27. Thus, during a heating or defrosting cycle in the operation of the refrigeration producer, moisture otherwise drawn from the goods confined within the conditioned space of the trailer 12 will again be returned to the ambient atmosphere within the trailer. Operation in this mode is the usual situation in transporting fresh produce, and has made systems including a heating cycle more successful than others in this particular operation.

It is believed readily apparent that the invention herein disclosed contemplates a refrigeration system and a method of operating the system wherein difficulties which have heretofore plagued the trucking industry in transporting perishable goods are avoided, through the accumulation and storage of condensate water formed on an evaporator coil and the subsequent dispersal of stored condensate water so as to maintain desired humidity conditions within a confined space. In particular, the accumulation, storage and dispersal of condensate water as herein described avoids unbalanced condition such as have heretofore occurred on initial start-up of a vapor compression cycle refrigeration producer when high thermal loads are imposed thereon, as when hot produce is loaded directly from the field into a conditioned space. Additionally, operation in accordance with this invention precludes the high weight loss and other adverse effects of dehumidification which have heretofore been accepted as a necessity.

In the drawings and specification, there have been set forth preferred embodiments of the invention, and although specific terms are employed, they are used in a generic and descriptive sense only and not for purposes of limitation, the scope of the invention being defined in the claims.

I claim:

1. In a refrigerating system for conditioning a confined space within an automotive vehicle body and perishable food products disposed therein and having a vapor compression cycle refrigeration producer including a compressor, a condenser, an evaporator and a fan positioned downstream of an exit face of the evaporator for drawing air from the conditioned space into heat exchange relation with the evaporator and flowing the air from the downstream side thereof to the conditioned space, means for facilitating the achievement of a predetermined condition within the conditioned space while avoiding damage to the food products disposed therein by the extraction of moisture therefrom and comprising:

condensate reservoir means for accumulating and storing water extracted from food products disposed in the conditioned space and condensed by the action of the evaporator on the air flowing therethrough, spray means operatively communicating with said reservoir means for releasing condensate water adjacent the downstream side of the evaporator so that the relative humidity of the air flowing therefrom to the conditioned space within the vehicle body is raised, the dry bulb temperature thereof is lowered, and moisture otherwise extracted from products in the conditioned space is returned thereto, said spray means including a condensate water pump operatively communicating with said reservoir means, power means operatively connected to said pump for driving the same and at least one fog spray nozzle interposed between the downstream side of said evaporator, and the fan operatively communicating with said pump for dispersing condensate water in fine droplets, and control means operatively connected to said power means and responsive to the quantity of condensate water stored by said reservoir means for controlling actuation of said power means to drive said pump only when said reservoir means contains at least a predetermined quantity of condensate water.

2. Apparatus as claimed in claim 1 wherein the reservoir means comprises a drip pan extending beneath the evaporator and a reservoir tank operatively communicating with said drip pan and wherein said control means comprises a float within said reservoir tank responsive to the condensate water level therein.

3. In a refrigerating system for conditioning a confined space and perishable food products disposed therein and having a vapor compression cycle refrigeration producer including a compressor, a condenser, an evaporator and a fan positioned downstream of an exit face of the evaporator for drawing air from the conditioned space into heat exchange relation with the evaporator and flowing the air from the downstream side thereof to the conditioned space, means for facilitating the achievement of a predetermined condition within the conditioned space while avoiding damage to the food products disposed therein by the extraction of moisture therefrom and comprising:

condensate reservoir means for accumulating and storing water extracted from food products disposed in the conditioned space and condensed by the action of the evaporator on the air flowing therethrough, spray means operatively communicating with said reservoir means for releasing condensate water adjacent the downstream side of the evaporator so that the relative humidity of the air flowing therefrom to the conditioned space is raised, the dry bulb temperature thereof is lowered, and moisture otherwise extracted from products in the conditioned space is returned thereto, said spray means including a condensate water pump operatively communicating with said reservoir means, power means operatively connected to said pump for driving the same and at least one fog spray nozzle interposed between the downstream side of said evaporator and the fan and operatively communicating with said pump for dispersing condensate water in fine droplets, and control means operatively connected to said power means and responsive to the quantity of condensate water stored by said reservoir means for controlling actuation of said power means to drive said pump only when said reservoir means contains at least a predetermined quantity of condensate water.

References Cited

UNITED STATES PATENTS

| | | | |
|---|---|---|---|
| 2,065,358 | 12/1936 | Zarotschenzeff | 62—91 |
| 2,110,025 | 3/1938 | Ridge | 62—91 |
| 2,123,742 | 7/1938 | Offen | 62—91 |
| 2,292,562 | 8/1942 | Huggins | 62—92 |
| 2,323,511 | 7/1943 | Baker | 62—274 |
| 2,385,140 | 9/1945 | Knowles | 62—63 |
| 2,654,232 | 10/1953 | Galazzi | 62—91 |
| 3,210,956 | 10/1965 | Maier | 62—188 |

WILLIAM J. WYE, *Primary Examiner.*